US006771941B2

(12) United States Patent
Kim

(10) Patent No.: US 6,771,941 B2
(45) Date of Patent: Aug. 3, 2004

(54) TRANSMISSION POWER CONTROL APPARATUS OF BASE STATION OF MOBILE COMMUNICATION NETWORK

(75) Inventor: Tae Young Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 649 days.

(21) Appl. No.: 09/809,245

(22) Filed: Mar. 16, 2001

(65) Prior Publication Data

US 2001/0023190 A1 Sep. 20, 2001

(30) Foreign Application Priority Data

Mar. 16, 2000 (KR) ........................................ 2000-13419

(51) Int. Cl.[7] .............................................. H04B 1/04
(52) U.S. Cl. .................................. 455/127.2; 455/562.1
(58) Field of Search ............................. 455/561, 562.1, 455/127.1, 127.2, 126, 522

(56) References Cited

U.S. PATENT DOCUMENTS 5,606,285 A * 2/1997 Wang et al. ................. 330/134
5,697,074 A * 12/1997 Makikallio et al. ......... 455/126

* cited by examiner

Primary Examiner—Nick Corsaro

(74) Attorney, Agent, or Firm—Fleshner & Kim, LLP

(57) ABSTRACT

A transmission power control apparatus of a base station of a mobile communication network including: an up-converter for converting a received intermediate frequency (IF) signal to a radio frequency (RF) signal and outputting it; a high power amplifier for amplifying the power of the signal outputted from the up-converter; a coupling unit for receiving the signal from the high power amplifier, extracting only a signal of a necessary frequency band and outputting the extracted signal to an antenna; an attenuator for receiving the signal from the coupling unit, controlling the gain of the signal and outputting it to the up-converter; a comparing unit for comparing the gain control signal applied from the up-converter and the gain control signal inputted from an external source and controlling the attenuator; a controlling unit for providing the gain control signal inputted from the external source to the comparing unit; and an automatic gain controller for generating a gain control signal, control a signal gain of the up-converter and providing the gain control signal to the comparing unit. The transmission power control apparatus additionally includes a second tuning function to receive a gain control signal from an external source to play a part in controlling the signal gain of the first voltage variable attenuator 40.

7 Claims, 2 Drawing Sheets

TRANSMISSION POWER CONTROL APPARATUS OF BASE STATION OF MOBILE COMMUNICATION NETWORK

BACKGROUND OF THE INVENTION

1. Field of the Invention

The present invention relates to a base station of a mobile communication network, and more particularly to a transmission power control apparatus of a base station of a mobile communication network.

2. Description of the Background Art

Generally, an up-converter of a transmitter in a base station of a mobile communication network converts an intermediate frequency (IF) signal to a radio frequency (RF) signal and controls the RF signal to have a suitable level of power (strength). For this purpose, the transmitter includes a voltage detecting unit, an automatic gain controller and an attenuator to detect the strength of a signal on the transmission path and generates a control signal to control the gain of the signal.

And, a different voltage detecting unit and a different controller constructed in other circuit board detect the strength of the signal outputted from the up-converter and control the gain of the signal to have the appropriate strength.

FIG. 1 is a schematic block diagram of the transmitter of a base station of a mobile communication network in accordance with a conventional art.

As shown in the drawing, a transmitting apparatus of the mobile communication network in accordance with the conventional art includes an up-converter 101 for converting a received intermediate frequency (IF) signal to an RF signal and controls the gain of the converted RF signal, a high power amplifier (HPA) 14 for amplifying the RF signal outputted from the up-converter 101 to a high power, a coupling unit 102 for receiving the high power RF signal from the HPA 14, extracting only a required specific frequency band component of the RF signal, and outputting the extracted signal to an antenna and to a voltage detecting unit 103, the voltage detecting unit 103 for converting the RF signal received from the coupling unit 102 to an IF signal and detecting a voltage level in proportion to the strength of the converted IF signal, and a controlling unit 104 for receiving the detected voltage and outputting a Tx_RF_GAIN signal.

The voltage detecting unit 103 and the controlling unit 104 serve to judge whether the RF signal on the transmission path has the proper strength and monitor it.

The up-converter 101 includes a splitter 2 for splitting an inputted signal to two different paths, fixed attenuators 3 and 21 for attenuating the power (strength) of the received signal; amplifiers 4 and 11 for compensating a loss generated during the process of attenuating a power, SAW filters 5 and 20 for extracting a required signal among signals outputted from the amplifier 4, a frequency up mixer 8 for converting the IF signal to an RF signal, a local oscillator 6 for generating a single frequency signal and providing it to the frequency up mixer 8, band pass filters (BPF) 7 and 9 for passing only a specific band signal, a voltage variable attenuator 10 for attenuating the power (strength) of the received signal under the control of the automatic gain controller 27, a coupler 12 for coupling a received signal to two elements, an isolator 13 for removing a reflection wave causing a transmission distortion, voltage detectors 26 and 28 for detecting a voltage level in proportion to the strength of the inputted signal, and the automatic gain controller 27 for generating a gain control signal for controlling the voltage variable attenuator 10.

The operation of the transmitter of the mobile communication network base station in accordance with the conventional art constructed as described above will now be explained.

An IF signal 1 inputted to the up-converter 101 is split to two paths by the splitter 2, and while the IF signal passes the first fixed attenuator 3, the amplifier 4 and the first SAW filter 5, a noise is canceled to a degree. And then, the IF signal is converted to an RF signal by the frequency up mixer 8 and the first local oscillator 6 and outputted to the second band pass filter 9.

As the RF signal passes the second band pass filter 9, its specific frequency band component is extracted, and the gain of the filtered signal is controlled to be down by the voltage variable attenuator 10 and outputted to the amplifier 11.

The amplifier 11 amplifies the power-attenuated RF signal to a certain level and outputs it to the isolator 13, and the isolator 13 removes the reflection wave included in the RF signal to prevent generation of a transmission distortion. The reflection wave-removed RF signal is outputted to the HPA 14.

The RF signal is amplified by the HPA 14 to have a high power and outputted to the coupling unit 102, so that an unnecessary frequency component of the RF signal is removed by the front end filter 15 of the coupling unit 102 and outputted back to the antenna, and also coupled by a directional coupler 16 of the coupling unit 102 so as to be outputted to the voltage detecting unit 103.

In the voltage detecting unit 103, the RF signal is converted to the IF signal by the second oscillator 18 and the frequency down mixer 17 and outputted to the amplifier 19. The second local oscillator 18 generates a signal having a single frequency and provides it to the frequency down mixer 17.

The IF signal is amplified by the amplifier 19 and inputted through the second SAW filter 20 and the second fixed attenuator 21 to the second voltage detector 22. The second voltage detector 22 detects the voltage of the received IF signal and outputs it to the controlling unit 104.

In the controlling unit 104, the voltage level signal (an analog signal) is converted into a digital signal and inputted to the controller 24. The controller 24 judges whether the RF signal transmitted through the antenna has a proper strength, computes a difference value (Δ) between the voltage detected by the voltage detecting unit 103 and a reference voltage and provides a Tx_RF_GAIN signal corresponding to the difference value (Δ) to the automatic gain controller 27. The controller 24 holds a Tx_RF_GAIN signal table corresponding to each voltage difference value.

In the up converter 101, the coupler 12 positioned before the isolator 13 outputs the received RF signal to the first voltage detector 26. The first voltage detector 26 detects the voltage level of the received RF signal and outputs it to the automatic gain controller 27. And, the third voltage detector 28 also receives the IF signal split by the splitter 2, detects the voltage level of the IF signal and outputs it to the automatic gain controller 27.

Consequently, the automatic gain controller 27 generates the gain control signal by using the voltage inputted from the first voltage detector 26, the voltage inputted from the third voltage detector 28 and the Tx_RF_GAIN signal inputted from the controlling unit 104, and controls the whole outputting of the transmitting apparatus by providing the generated gain control signal to the voltage variable attenuator 10.

That is, the automatic gain controller 27 generates the gain control signal according to the strength of the RF signal provided from the first voltage detector 26, or generates the gain control signal according to the Tx_RF_GAIN signal provided from the controlling unit 104, to control the strength of the RF signal transmitted through the transmission antenna.

The conventional transmission power controlling apparatus of the mobile communication network base station, however, has the following problems.

That is, since the voltage detector, the filter, the local oscillator and the frequency mixer are used redundantly, the production cost of the system is increased.

In addition, the path loss and the deviation due to the allowable error of the elements occurring in the circuit itself which monitors and controls the output signal.

Moreover, the gain control signal may be varied depending on what value a system sets as an initial value when the up-converter is manufactured, and when the base station transmitter is installed, since the calibration is made for the power (strength) of a signal transmitted to the antenna, it is difficult to verify whether the up-converter operates properly without any trouble.

SUMMARY OF THE INVENTION

Therefore, an object of the present invention is to provide a transmission power control apparatus of a base station of a mobile communication network which does not include any redundant parts, and in which a signal gain of an up-converter can be also adjusted by an external source.

To achieve these and other advantages and in accordance with the purpose of the present invention, as embodied and broadly described herein, there is provided a transmission power control apparatus of a base station of a mobile communication network including: an up-converter for converting a received intermediate frequency (IF) signal to a radio frequency (RF) signal and outputting it; a high power amplifier for amplifying the power of the signal outputted from the up-converter; a coupling unit for receiving the signal from the high power amplifier, extracting only a signal of a necessary frequency band and outputting the extracted signal to an antenna; an attenuator for receiving the signal from the coupling unit, controlling the gain of the signal and outputting it to the up-converter; a comparing unit for comparing the gain control signal applied from the up-converter and the gain control signal inputted from an external source and controlling the attenuator; a controlling unit for providing the gain control signal inputted from the external source to the comparing unit; and an automatic gain controller for generating a gain control signal, control a signal gain of the up-converter and providing the gain control signal to the comparing unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
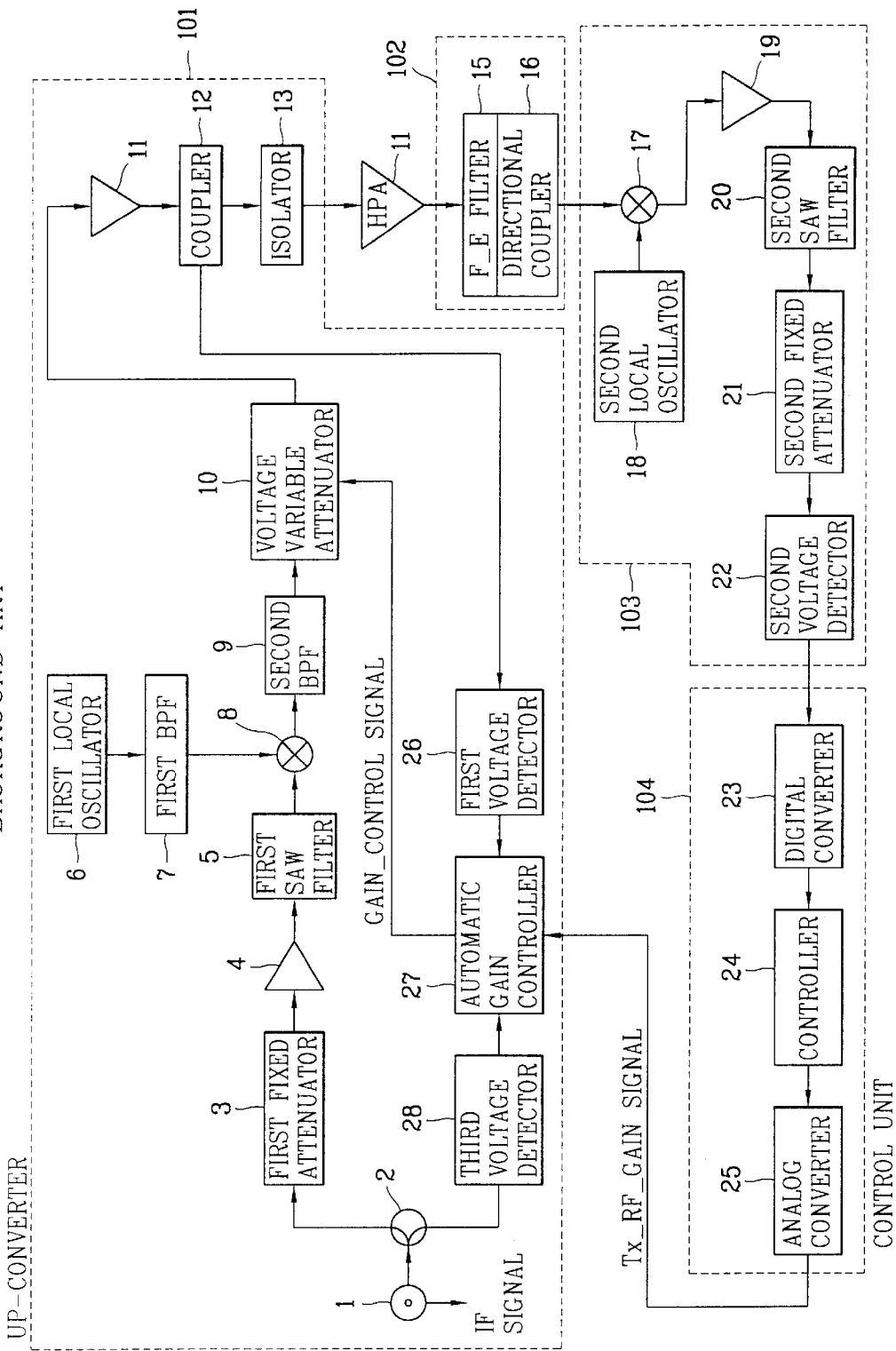
FIG. 1 is a schematic block diagram of transmitting apparatus of a base station of a mobile communication network in accordance with a conventional art.
Figure 2:
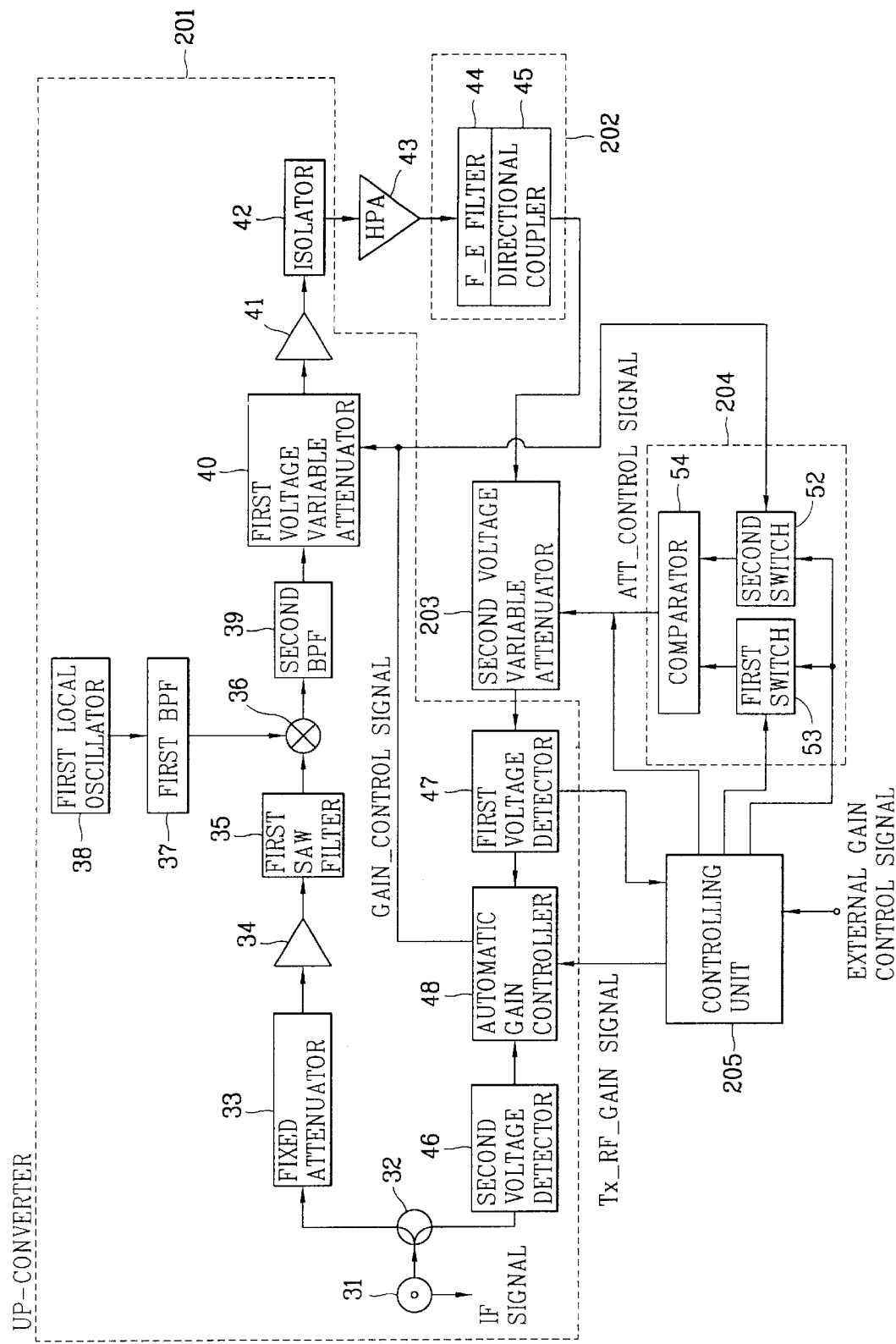
FIG. 2 is a schematic block diagram of a transmitting apparatus of a base station of a mobile communication network in accordance with the present invention.

FIG. 2 is a schematic block diagram of a transmitting apparatus of a base station of a mobile communication network in accordance with the present invention.

As shown in the drawing, the transmitting apparatus of the base station of the mobile communication network includes an up-converter 201 for converting a received IF signal to an RF signal and controls the gain of the RF signal, a high power amplifier (HPA) 43 for amplifying the RF signal outputted from the up-converter 201 to a high power, a coupling unit 202 for receiving the high power RF signal from the HPA 43, extracting only a signal of a required frequency band and outputting the extracted signal to an antenna and a second voltage variable attenuator 203, and a controlling unit 205 for providing a gain control signal inputted from an external source to the comparing unit 54 or providing a Tx_RF_GAIN signal to an automatic gain controller 48.

The up-converter 201 includes a splitter 32 for splitting an inputted signal to two different paths; a fixed attenuator 33 for attenuating the power (strength) of an inputted signal, amplifiers 34 and 41 for compensating the loss generated in the process of attenuating the power of the signal; a SAW filter 35 for extracting only a required signal among signals outputted from the amplifier 34, a frequency up mixer 36 for converting an IF signal to an RF signal, a local oscillator 38 for generating a single frequency signal and providing it to the frequency up mixer 36, band pass filters 37 and 39 for passing only a specific band signal, voltage variable attenuators 40 and 203 for attenuating the power (strength) of a received signal under the control of the automatic gain controller 48, an isolator 42 for removing a reflection wave causing a transmission distortion, voltage detectors 46 and 47 for detecting a voltage level in proportionate to the strength of an inputted signal; and the automatic gain controller 48 for generating a gain control signal to control the voltage variable attenuator 40.

The operation of the transmission power control apparatus of the base station of the mobile communication network constructed as described above will now be explained.

The IF signal 31 inputted to the up-converter 201 is split to two paths by the splitter 32 and passes the fixed attenuator 33, the amplifier 34 and the SAW filter 35, during which a noise thereof is canceled to a degree. And then, the IF signal is converted to an RF signal by the first local oscillator 38 and outputted to the second band pass filter 39.

As the converted RF signal passes the second band pass filter 39, a specific band component is extracted by the second band pass filter 39 and its gain is down-adjusted by the first voltage variable attenuator 40 and outputted to the amplifier 41.

The amplifier 41 amplifies the power-attenuated RF signal to a predetermined level and outputs it to the isolator 42. The isolator 42 removes the reflection wave included in the inputted RF signal to thereby prevent generation of a transmission distortion. The reflection wave-removed RF signal is outputted to the HPA 43.

The RF signal is amplified by the HPA 43 to have a high power and outputted to the coupling unit 202. And then, the unnecessary frequency component of the RF signal is removed by a front end filter 44 of the coupling unit 202 and outputted to the antenna. The RF signal is also coupled by the directional coupler 45 of the coupling unit 202 and outputted to the second voltage variable attenuator 203.

The second voltage variable attenuator 203 adjusts the power attenuation amount of the inputted RF signal under the control of the comparing unit 204 and outputs the adjusted RF signal to the first voltage detector 47.

Then, the first voltage detector 47 detects a voltage level of the adjusted RF signal and outputs it to the automatic gain controller 47 and to the controlling unit 205.

The controlling unit 205 computes a difference value (Δ) between the voltage of the inputted RF signal and an internally set reference voltage and provides a Tx_RF_GAIN signal corresponding to the difference value (Δ) to the automatic gain controller 48.

The other IF signal split to a different path by the splitter 32 is inputted to the second voltage detector 46, by which its voltage level is detected. The detected voltage is inputted to the automatic gain controller 48.

The automatic gain controller 48 generates a gain control signal by using the voltage inputted from the first voltage detector 47, the voltage inputted from the second voltage detector 48 and the Tx_RF_GAIN signal inputted from the controlling unit 205, to control the first voltage variable attenuator 40. The first voltage variable attenuator 40 maintains constantly the strength of the RF signal transmitted through the antenna under the control of the automatic gain controller 48.

When the gain control signal is inputted to the controlling unit 205 from an external source, the controlling unit 205 turns the switches 52 and 53 of the comparing unit 204.

As the switches 52 and 53 operate, the gain control signal, which has been provided to the first voltage variable attenuator 40 from the automatic gain controller 48, is also provided to the comparator 54 through the first switch 52, and a gain control signal inputted from an external source is inputted through the second switch 53 to the comparator 54.

The comparator 54 compares the two gain control signals received through the switches 52 and 53 and provides a suitable attenuation control signal to the second voltage variable attenuator 203 so that the gain control signal value of the first switch can be adjusted to the reference signal (the external gain control signal).

Meanwhile, if no external gain control signal is provided, the controlling unit 205 does not operate the switches 52 and 53 of the controlling unit 204 and provides the internally set attenuation control signal to the second voltage variable attenuator 203.

In other words, the second voltage variable attenuator 203 receives the attenuation control signal from the comparator 54 or from the controlling unit 204 and controls the strength of the RF signal inputted from the coupling unit 202, and the adjusted RF signal affects the Tx_RF_GAIN signal and even the gain control signal of the automatic gain controller 48, so that the output signal of the transmitter of the base station of the mobile communication network can be arbitrarily adjusted.

As so far described, the transmission power control apparatus of a base station of a mobile communication network includes a second tuning function to receive a gain control signal from an external source to play a part in controlling the signal gain of the first voltage variable attenuator 40, in addition to the first tuning function performed by the up-converter within the system without an interference from outside. For the second tuning, the switches 52 and 53, the comparator 54 and the second voltage variable attenuator 203 are provided.

Also, functions of generating and monitoring the attenuation control signal are provided.

Moreover, by adding the second tuning, an error generated in a portion (the HPA 43, coupling unit 202 or signal lines between elements) other than the up-converter is compensated, and the transmission signal is more accurately calibrated, so that an optimum signal power can be applied to the antenna.

Furthermore, in the present invention, the circuits (elements) redundantly used unnecessarily in the transmitting apparatus of a base station of the conventional art are excluded or their construction is differently formed. Thus, an expense reduction effect can be obtained.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A transmission power control apparatus of a base station of a mobile communication network comprising:
   an up-converter for converting a received intermediate frequency (IF) signal to a radio frequency (RF) signal and outputting it;
   a high power amplifier for amplifying the power of the signal outputted from the up-converter;
   a coupling unit for receiving the signal from the high power amplifier, extracting only a signal of a necessary frequency band and outputting the extracted signal to an antenna;
   an attenuator for receiving the signal from the coupling unit, controlling the gain of the signal and outputting it to the up-converter;
   a comparing unit for comparing the gain control signal applied from the up-converter and the gain control signal inputted from an external source and controlling the attenuator;
   a controlling unit for providing the gain control signal inputted from the external source to the comparing unit; and
   an automatic gain controller for generating a gain control signal, control a signal gain of the up-converter and providing the gain control signal to the comparing unit.

2. The apparatus of claim 1, wherein the comparing unit comprising:
   a switch for receiving the gain control signal generated by the automatic gain controller and a reference gain control signal provided from the controlling unit; and a comparator for comparing the two gain control signals applied through the switch and controlling the attenuator.

3. The apparatus of claim 1, wherein the controlling unit operates the switch of the comparing unit when a gain control signal is provided from an external source.

4. The apparatus of claim 1, wherein the controlling unit does not operate the switch of the comparing unit unless a gain control signal is provided from an external source, and controls the attenuator with an internally set gain control signal.

5. The apparatus of claim 1, wherein the attenuator is controlled by the controlling unit unless a gain control is not provided from an external source, and is controlled by the comparing unit if a gain control signal is provided from an external source.

6. The apparatus of claim 1, wherein the up-converter, the attenuator, the automatic gain controller, the comparing unit and the controlling unit perform first tuning to control the gain of the RF signal in the system without an interference from outside and perform second tuning to play a part in controlling the gain of the RF signal by using the gain control signal inputted from an external source.

7. The apparatus of claim 6, wherein the second tuning is performed to compensate an error generated in a transmission path, that is, the high power amplifier, the coupling unit or the connection signal line between elements, of the other part than the up-converter.

* * * * *